(12) United States Patent
Park

(10) Patent No.: US 6,859,094 B2
(45) Date of Patent: Feb. 22, 2005

(54) PHASE DEMODULATION METHOD FOR MINIMIZING PHASE ERROR IN COMMUNICATION SIGNALS

(75) Inventor: Sung-Jin Park, Suwon-shi (KR)

(73) Assignee: Samsung Electronics Co., Ltd., Suwons-si (KR)

( * ) Notice: Subject to any disclaimer, the term of this patent is extended or adjusted under 35 U.S.C. 154(b) by 21 days.

(21) Appl. No.: 10/616,174

(22) Filed: Jul. 8, 2003

(65) Prior Publication Data

US 2004/0071230 A1 Apr. 15, 2004

(30) Foreign Application Priority Data

Oct. 9, 2002 (KR) .................................. 10-2002-0061478

(51) Int. Cl.[7] .............................................. H03D 1/00
(52) U.S. Cl. ...................................... 329/345; 375/340
(58) Field of Search ................................ 329/345, 304; 375/340; 708/422; 331/45

(56) References Cited

U.S. PATENT DOCUMENTS

| 4,112,358 A | * | 9/1978 | Ashida .................... 324/76.62 |
| 4,112,497 A | * | 9/1978 | Fletcher et al. ............. 708/422 |
| 4,412,302 A | * | 10/1983 | Nossen ........................ 702/57 |
| 6,618,450 B1 | * | 9/2003 | Hatta ......................... 375/340 |

* cited by examiner

Primary Examiner—Robert Pascal
Assistant Examiner—Joseph Chang
(74) Attorney, Agent, or Firm—Cha & Reiter, L.L.C.

(57) ABSTRACT

Disclosed is a phase-demodulation method for minimizing the phase error of a communication signal. The phase-demodulation method for demodulating a phase-demodulated communication signal using a digital phase-demodulation algorithm includes the steps of: adding one sampling to the digital phase-demodulation algorithm represented by an equation $$F_k(x) = \sum_{k=0}^{k-1} C_k x^k,$$

where k is the number of sampling times and $C_k$ is a complex constant; and, demodulating the phase-demodulated communication signal. Accordingly, the phase-demodulation method minimizes the phase error generated when a noise is propagated in phase space during a demodulation time of the phase-modulated communication signal, using a minimum number of sampling times and a minimum number of calculation times.

3 Claims, 4 Drawing Sheets

PHASE DEMODULATION METHOD FOR MINIMIZING PHASE ERROR IN COMMUNICATION SIGNALS

CLAIM OF PRIORITY

This application claims priority to an application entitled "PHASE DEMODULATION METHOD FOR MINIMIZING PHASE ERROR OF COMMUNICATION SIGNAL," filed in the Korean Intellectual Property Office on Oct. 9, 2002 and assigned Serial No. 2002-61478, the contents of which are hereby incorporated by reference.

BACKGROUND OF THE INVENTION

1. Field of the Invention

The present invention generally relates to a phase-demodulation method for demodulating a phase-modulated communication signal. More particularly, the present invention relates to a phase-demodulation method for minimizing the phase error generated by noise.

2. Description of the Related Art

Typically, a phase-modulation/demodulation method in a communication field simultaneously varies and transmits the phase of sinusoidal waves of a predetermined frequency at intervals of a predetermined phase. Several problems causing distortions of the sinusoidal waves are created in such a process. An example of this is when a communication signal is loaded on a carrier wave and interference with other signals occurs, or noise is undesirably added to a desired signal, etc., thereby distorting the sinusoidal waves. If a signal having the distorted sinusoidal waves is received at a reception end, a frequency of the signal is adjusted down to an initial frequency and filtered to be proper to a signal bandwidth in such a way that the signal is demodulated to an original signal. Commonly, in case of describing the physical characteristics of a modulation/demodulation process, the above steps are simplified as a procedure for adding an independent Gaussian noise to an original signal. Provided that the Gaussian noise is not considered, signal waves received at a reception end can be represented by the following Equation 1.

$$w(\varphi) = \sum_m \alpha_m e^{im(\varphi+\varphi_0)} \quad [\text{Eq. 1}]$$

In case of a digital phase demodulation, a demodulated signal is sampled at more than twice the original signal frequency. In this case, in case of representing a sampling interval as a phase interval of $\delta$, a k-th sampled value is represented by the following Equation 2.

$$w_k = \sum_m \alpha_m e^{im\varphi_0} e^{imk\delta} \quad [\text{Eq. 2}]$$

A method for demodulating values called I and Q signals from the above sampling signals is called a phase-demodulation algorithm. Such phase-demodulation algorithm can be represented by the following Equation 3.

$$S = \sum_{k=0}^{K-1} c_k w_k \quad [\text{Eq. 3}]$$

-continued $$c_k \equiv a_K + ib_k$$

$$\therefore S = \sum_{k=0}^{K-1} (a_k + ib_k) w_k$$

$$I = real\{S\}$$

$$Q = imag\{S\}$$

Characteristics of the phase-demodulation algorithm are determined by a coefficient $C_k$ used in a complex phasor S.

FIG. 1A is a view illustrating a constellation in a conventional 3-sample algorithm (i.e., 3-point algorithm). FIG. 1B is a view illustrating a phase-error distribution in a conventional 3-sample algorithm. FIG. 2A is a view illustrating a constellation in a conventional 4-sample algorithm (i.e., 4-point algorithm). FIG. 2B is a view illustrating a phase-error distribution in a conventional 4-sample algorithm.

Referring to FIGS. 1A and 2A, in case of considering an axis of 0° and an axis of 90° as reference lines, FIG. 1A using the 3-point algorithm shows that symbols α and β each have errors of almost 90° and the distribution of the errors is in a wide range. FIG. 2A using the 4-point algorithm shows that values of the symbols γ and δ are much less than the symbols α and β.

In addition, as shown in FIGS. 1B and 2B, the 4-point algorithm reduces the error distribution much more than the 3-point algorithm does.

It is noted that the aforesaid digital phase-demodulation algorithms more accurately calculate a signal phase in proportion to the number of sampling times and is also resistant to noise.

However, it is impossible to increase the number of sampling times indefinitely in case of a symbol rate of a very high value. Also, a processor used for phase calculation may receive an excessive load during a phase calculation time.

Therefore, there is a need for an optimized algorithm for calculating an accurate phase using a minimum number of sampling times and a minimum number of calculation times.

SUMMARY OF THE INVENTION

The present invention is to provide a phase-demodulation method for minimizing the phase error generated when a noise is propagated in phase space during a demodulation period of a phase-modulated communication signal.

One aspect of the present invention is to provide a phase-demodulation method for minimizing the phase error of a communication signal by calculating the accurate phase using a minimum number of sampling times and a minimum number of calculation times.

In yet another aspect of the present invention, a phase-demodulation method is provided for improving a phase-demodulation process applicable to various kinds of phase-demodulation algorithms by only changing a signal-processing method.

In one embodiment of the present invention, a phase-demodulation method for demodulating a phase-demodulated communication signal using a digital phase-demodulation algorithm, including the steps of: adding one sampling to the digital phase-demodulation algorithm represented by an equation $$F_k(x) = \sum_{k=0}^{k-1} C_k x^k,$$

where k is the number of sampling times and $C_k$ is a complex constant; and, demodulating the phase-demodulated communication signal.

In the embodiment, the step of adding one sampling for a phase-error minimization to the digital phase-demodulation algorithm may be represented by the following equation:

$$F'_{K+1}(x) = \sum_{k=0}^{K-1} c_k x^k (\lambda - x)$$

$$= \sum_{k=0}^{K-1} c_k \lambda x^k - \sum_{k=0}^{K-1} c_k x^{k+1}$$

$$= c_0 \lambda + \sum_{k=1}^{K-1} c_k \lambda x^k - \sum_{k=1}^{K-1} c_{k-1} x^k - c_{K-1} x^K$$

$$= c_0 \lambda - c_{K-1} x^K + \sum_{k=1}^{K-1} (c_k \lambda - c_{k-1}) x^k$$

$$\equiv \sum_{k=0}^{K} d_k x^k$$

where k is the number of sampling times, $C_k$ and $d_k$ are complex constants, and $\lambda - x$ indicates the one sampling added in the step.

In the embodiment, the phase-error minimization may be determined by the value of $\lambda$ satisfying the following equation:

$$\gamma^2 = \left| \sum_{k=0}^{K} d_k^2 \right|$$

$$= c_0^2 \lambda^2 + c_{K-1}^2 + \sum_{k=1}^{K-1} (c_k^2 \lambda^2 + c_{k-1}^2 - 2c_{k-1} c_k \lambda)$$

$$= \sum_{k=0}^{K-1} c_k^2 \lambda^2 - 2 \sum_{k=1}^{K-1} c_{k-1} c_k \lambda + \sum_{k=0}^{K-1} c_k^2$$

where k is the number of sampling times, $C_k$ and $d_k$ are complex constants, and $\gamma$ is a phase error.

DETAILED DESCRIPTION OF THE PREFERRED EMBODIMENTS

Figure 1A:
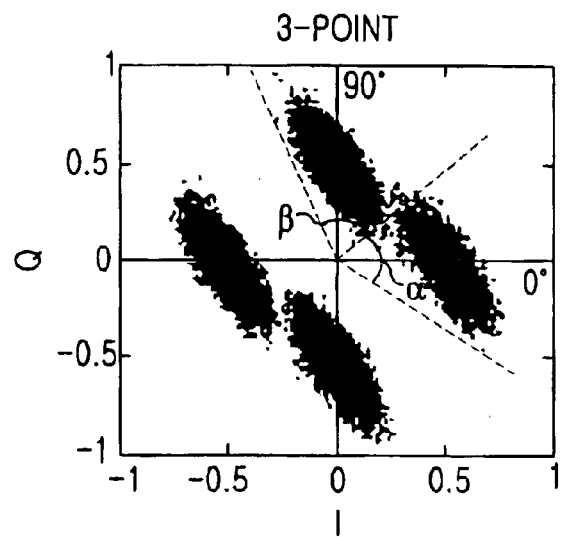
FIG. 1A is a view illustrating a constellation in a conventional 3-sample algorithm (i.e., 3-point algorithm)
Figure 1B:
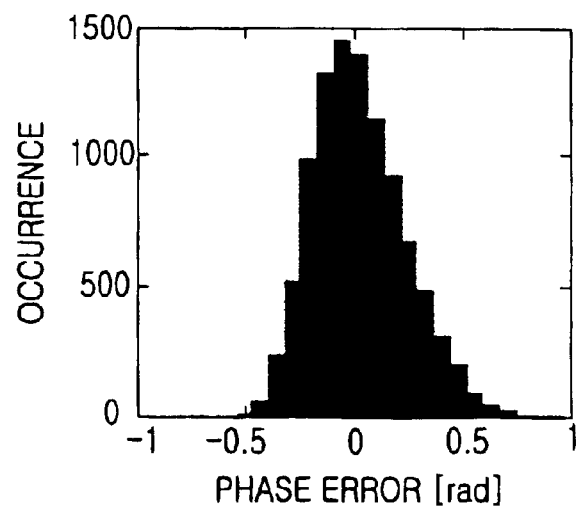
FIG. 1B is a view illustrating a phase-error distribution in a conventional 3-sample algorithm.

In accordance with the present invention, preferred embodiments of the present invention will be described in detail with reference to the annexed drawings. In the drawings, the same or similar elements are denoted by the same reference numerals even though they are depicted in different drawings. For the purposes of clarity and simplicity, a detailed description of known functions and configurations incorporated herein will be omitted as it may make the subject matter of the present invention unclear.

The present invention relates to a method for minimizing a phase error in the case where physical noises are propagated in the phase spaces (i.e., I and Q spaces) of a signal in the step for determining the coefficient $C_k$. In the case where Gaussian noise having an average value of 0 and a standard deviation of $\sigma$ is added to signal waveforms during a communication step, sampled signals are affected by the Gaussian noise as shown in the following Equation 4.

$$w'_k = w_k + \Delta w_k$$
$$\langle \Delta w_k \rangle = 0$$
$$\langle \Delta w_j^* \Delta w_k \rangle = \sigma^2 \delta_{jk} \qquad [\text{Eq. 4}]$$

The above signals are propagated with a complex phasor S as shown in the following Equation 5.

$$S' = \sum_{k=0}^{K-1} c_k w'_k \qquad [\text{Eq. 5}]$$

$$= \sum_{k=0}^{K-1} c_k w_k + \sum_{k=0}^{K-1} c_k \Delta w_k$$

$$= S + \Delta S$$

Errors of the complex phasor S can be represented as a magnitude error $\langle |\Delta S|^2 \rangle$ and an angle error $\langle |\Delta \phi|^2 \rangle$ in phase space.

Figure 3:
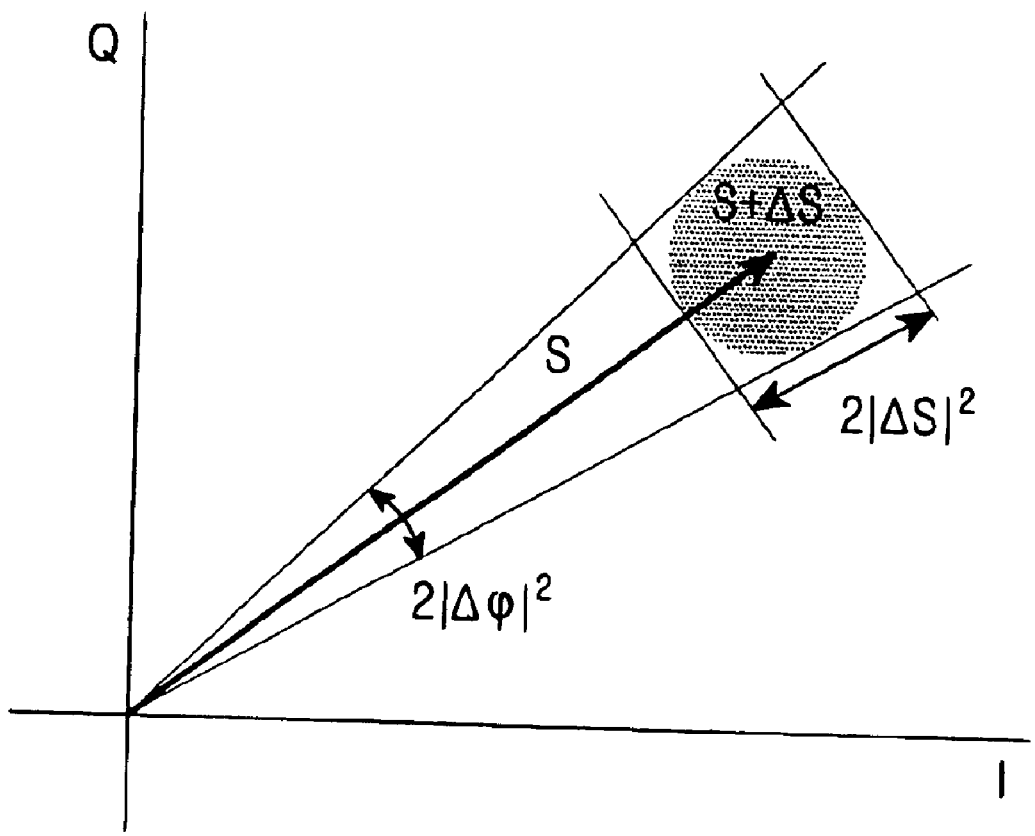
FIG. 3 is a view illustrating the relationship between phase magnitude and phase deviation in the case where noise added to the original signal is propagated in a phase plane.

FIG. 3 is a view illustrating the relationship between phase magnitude and phase deviation in the case where noise added to an original signal is propagated in a phase plane. Particularly, FIG. 3 shows that the noise propagated in the phase space spreads a complex phasor S so that a phase error occurs.

The aforesaid magnitude error and phase error of the complex phasor can be represented by the following Equation 6. In case of the phase error, the Taylor expansion method is used on the assumption that the phase error is low, and the value corresponding to a linear term is further reflected in a calculation procedure.

$$\langle \Delta S \rangle = 0 \qquad [\text{Eq. 6}]$$

$$\langle |\Delta S|^2 \rangle = \sum_{k=0}^{K-1} |c_k|^2 \sigma^2$$

$$= \rho^2 \sigma^2$$

$$\langle |\Delta \varphi|^2 \rangle \cong \frac{\sigma^2}{|S|^2} \{\rho^2 - \gamma^2 \cos[2(\varphi - \theta)]\}, \ (|\Delta \varphi| \ll 1)$$

-continued $$\rho^2 = \sum_{k=0}^{K-1} |c_k|^2$$

$$\gamma^2 = \left|\sum_{k=0}^{K-1} c_k^2\right|$$

$$\theta = \frac{1}{2}\arg\left(\sum_{k=0}^{K-1} c_k^2\right)$$

A constant $C_k$ for minimizing an error of the complex phasor can be calculated by the above Eq. 6. The magnitude error is of little importance in a phase-modulation/demodulation method. It is necessary to minimize the phase error only. Provided that a signal phase $\phi$ is contained in the phase error, the value $<|\Delta\phi|^2>$ of the phase error ranges from a minimum value $$\frac{\sigma^2}{|S|^2}[\rho^2 + \gamma^2]$$

to a maximum value $$\frac{\sigma^2}{|S|^2}[\rho^2 + \gamma^2].$$

Therefore, in order to minimize the phase-error value, only $\gamma^2$ should be minimized.

Therefore, in order to minimize the phase error in a phase-demodulation algorithm for demodulating phase-modulated communication signals, a phase-demodulation algorithm needs to demodulate an accurate phase, and the value of $\gamma^2$ should be zero. In order to recognize a principle for enabling the phase-demodulation algorithm to demodulate an accurate phase, the complex phasor S is represented by the following Equation 7.

$$S = \sum_{k=0}^{K-1} c_k w_k \qquad [\text{Eq. 7}]$$

$$= \sum_{k=0}^{K-1} c_k \sum_m \alpha_m e^{im\varphi_0} e^{imk\delta}$$

$$= \sum_m \alpha_m e^{im\varphi_0} \sum_{k=0}^{K-1} c_k e^{im\delta}$$

$$= \sum_m \alpha_m e^{im\varphi_0} F_K(e^{im\delta})$$

$$F_K(x) = \sum_{k=0}^{K-1} c_k x^k$$

Considering that the complex phasor S must have a phase of $\phi_0$, a value of $F_K(e^{im\delta})$ must be 0 in case of $m \ne 1$, or should be 1 in case of $m=1$. So, $F_K(x)$ can be represented as a characteristic polynomial having the solution value of $e^{im\delta}$ in case of $m \ne 1$. Herein, there is no problem in the phase demodulation step even though $F_K(x)$ has another solution value. In case of using an arbitrary phase-demodulation algorithm, i.e., in case $F_K(x)$ is fixed to a predetermined value, there is no problem even though a specific value of $\lambda - x$ in case of $\lambda \ne e^{i\delta}$ is multiplied by the value of $F_K(x)$.

Therefore, one arbitrary solution is added to an arbitrary phase-demodulation characteristic polynomial so that a phase error is reduced. If a solution is added to a characteristic polynomial, the degree of the characteristic polynomial increases and the value of K also increases so that the number of sampling points (i.e., times) increases by one. If the number of sampling times increases, reduction of the phase error is reasonable. If a wrong phase-demodulation algorithm is adopted even though the number of sampling times increases, the phase error may be excessively higher. However, a phase-demodulation algorithm created in accordance with the present invention can minimize the phase error at all times.

First of all, one solution is added to an arbitrary phase-demodulation characteristic polynomial as shown in the following Equation 8.

$$F'_{K+1}(x) = \sum_{k=0}^{K-1} c_k x^k (\lambda - x) \qquad [\text{Eq. 8}]$$

$$= \sum_{k=0}^{K-1} c_k \lambda x^k - \sum_{k=0}^{K-1} c_k x^{k+1}$$

$$= c_0 \lambda + \sum_{k=1}^{K-1} c_k \lambda x^k - \sum_{k=1}^{K-1} c_{k-1} x^k - c_{K-1} x^K$$

$$= c_0 \lambda - c_{K-1} x^K + \sum_{k=1}^{K-1} (c_k \lambda - c_{k-1}) x^k$$

$$\equiv \sum_{k=0}^{K} d_k x^k$$

In addition, in order to minimize the phase error, the following Equation 9 must be satisfied.

$$\gamma^2 = \left|\sum_{k=0}^{K} d_k^2\right| \qquad [\text{Eq. 9}]$$

$$= c_0^2 \lambda^2 + c_{K-1}^2 + \sum_{k=1}^{K-1} (c_k^2 \lambda^2 + c_{k-1}^2 - 2c_{k-1} c_k \lambda)$$

$$= \sum_{k=0}^{K-1} c_k^2 \lambda^2 - 2 \sum_{k=1}^{K-1} c_{k-1} c_k \lambda + \sum_{k=0}^{K-1} c_k^2 = 0$$

In case of making a phase-demodulation algorithm by calculating the value of $\lambda$ from a quadratic equation related to $\lambda$ shown in the above Eq. 9, a phase error can be minimized regardless of Gaussian noise being added to communication signals. Although the present invention is described on the assumption that the phase error has a low value, more effective results can be obtained if the present invention is actually applied to a phase modulation/demodulation method for subdividing phase intervals.

Figure 2A:
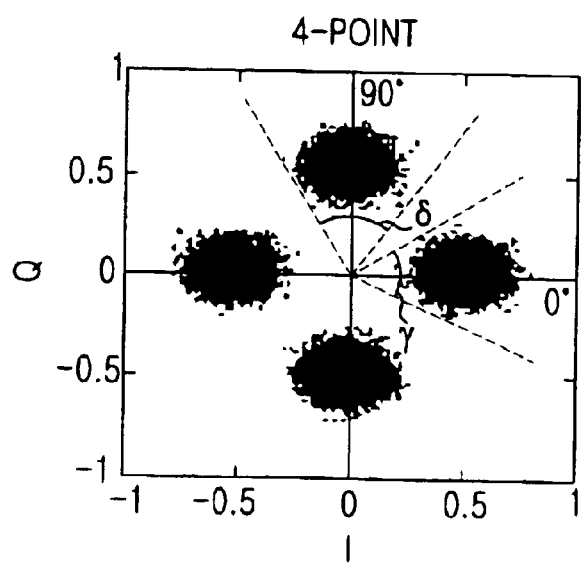
FIG. 2A is a view illustrating a constellation in a conventional 4-sample algorithm (i.e., 4-point algorithm)
Figure 2B:
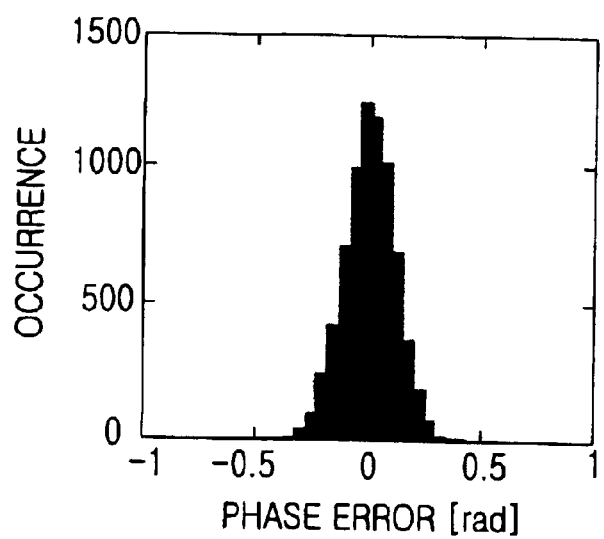
FIG. 2B is a view illustrating a phase-error distribution in a conventional 4-sample algorithm.
Figure 4A:
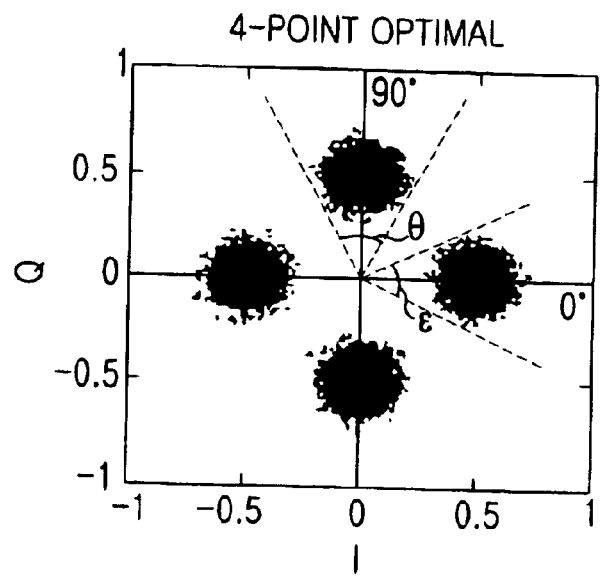
FIG. 4A is a view illustrating a constellation in a conventional 4-sample algorithm (i.e., 4-point algorithm) in accordance with a preferred embodiment of the present invention; and, FIG. 4B is a view illustrating a phase-error distribution in a conventional 4-sample algorithm in accordance with a preferred embodiment of the present invention.
Figure 4B:
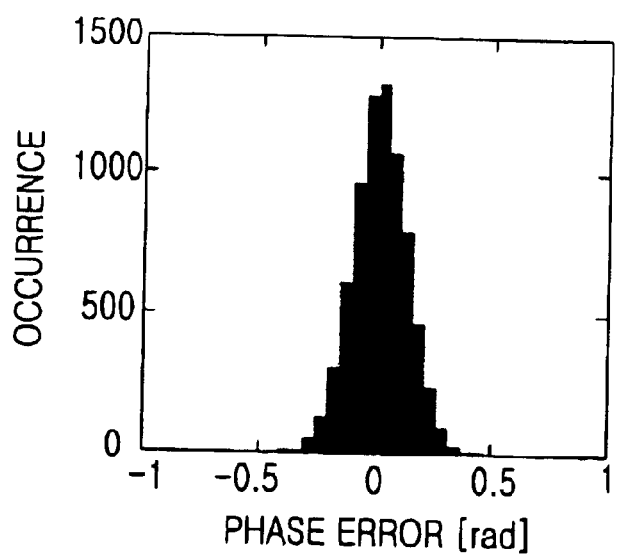

FIG. 4A is a view illustrating a constellation in a conventional 4-sample algorithm (i.e., 4-point algorithm) in accordance with a preferred embodiment of the present invention. FIG. 4b is a view illustrating a phase-error distribution in a conventional 4-sample algorithm in accordance with a preferred embodiment of the present invention. As shown in FIG. 4A, the magnitudes of $\epsilon$ and $\theta$ are much less than $\alpha$ and $\beta$ shown in FIG. 1A using the conventional 3-point algorithm and $\gamma$ and $\delta$ shown in FIG. 2A using the conventional 4-point algorithm.

The following Table 1 is provided to illustrate the relationship among three kinds of phase-demodulation algorithms for performing a phase-demodulation operation by sampling a phase of input signals at intervals of $\pi/3$ radians.

In this case, all the algorithms are designed to calculate the phase by automatically removing DC components from the input signals.

TABLE 1

|  | 3-sample algorithm | 4-sample algorithm | 3-sample algorithm + 1-sample algorithm |
|---|---|---|---|
| $a_k$ | 0, π/3, 2π/3 {1, −1.5, 0.5} | 0, π/3, 2π/3, π {1, −1, −1, 1} | 0, π/3, 2π/3, π {1, −0.75, −1.198, 0.9478} |
| $b_k$ | {0, 0.8660, −0.8660} | {0, 1.732, −1.732, 0} | {0, 1.528, −1.209, −0.3188} |
| Phase deviation [rad] | 0.02540 (Maximum) 0.04678 (Minimum) | 0.01386 (Maximum) 0.02023 (Minimum) | 0.01342 |

The signal used for such phase demodulation is represented by the equation of 0.1+cos(φ), and the Gaussian noise having a standard deviation of 0.1 is added to this signal.

As shown above, Table 1 illustrates a first conventional algorithm for performing a phase-demodulation operation using three samplings (i.e., 3-sample algorithm or 3-point algorithm), and a second conventional algorithm using four samplings (i.e., 4-sample algorithm or 4-point algorithm). Based on Table 1, variables of $a_k$ and $b_k$ and maximum and minimum values of phase deviation can be recognized. Further, in accordance with the present invention shown in the third column of Table 1, one sampling is added to the 3-sample algorithm to create an algorithm (i.e., 4-sample algorithm) for minimizing a phase error so that variables of $a_k$ and $b_k$ and maximum and minimum values of phase deviations also can be recognized.

The second conventional algorithm shown in the second column of Table 1 and the algorithm of the present invention shown in the third column of Table 1 perform four samplings, so that they can be compared with each other directly as shown in Table 1. Apparently from Table 1, the inventive algorithm shown in the third column calculates a phase more accurately than the second conventional algorithm shown in the second column.

As is apparent from the above description, since a phase-demodulation method according to the present invention demodulates a phase-modulated communication signal by adding one sampling minimizing the phase error to an arbitrary digital phase-demodulation algorithm, it minimizes the phase error generated when a noise is propagated in phase space during a demodulation time of the phase-modulated communication signal, using a minimum number of sampling times and a minimum number of calculation times.

Furthermore, a phase-demodulation method according to the present invention is applied easily to various kinds of phase-demodulation algorithms by only changing the signal-processing method, thereby improving the phase-demodulation process.

While the invention has been shown and described with reference to a preferred embodiment thereof, it will be understood by those skilled in the art that various changes in form and details may be made therein without departing from the spirit and scope of the invention as defined by the appended claims. Therefore, this invention is not to be unduly limited to the embodiment set forth herein, but to be defined by the appended claims and the equivalents thereof.

What is claimed is:

1. A phase-demodulation method for demodulating a phase-demodulated communication signal through a predetermined number of samplings using a digital phase-demodulation algorithm, comprising the steps of:

adding one sampling to the digital phase-demodulation algorithm represented by an equation $$F_k(x) = \sum_{k=0}^{k-1} C_k x^k,$$

where k represents the number of sampling times and $C_k$ represents a complex constant; and, demodulating the phase-demodulated communication signal.

2. The phase-demodulation method according to claim 1, wherein the step of adding one sampling for a phase-error minimization to the digital phase-demodulation algorithm is represented by the following equation:

$$F'_{K+1}(x) = \sum_{k=0}^{K-1} c_k x^k (\lambda - x)$$

$$= \sum_{k=0}^{K-1} c_k \lambda x^k - \sum_{k=0}^{K-1} c_k x^{k+1}$$

$$= c_0 \lambda + \sum_{k=1}^{K-1} c_k \lambda x^k - \sum_{k=1}^{K-1} c_{k-1} x^k - c_{K-1} x^K$$

$$= c_0 \lambda - c_{K-1} x^K + \sum_{k=1}^{K-1} (c_k \lambda - c_{k-1}) x^k$$

$$\equiv \sum_{k=0}^{K} d_k x^k$$

where k represents the number of sampling times, $C_k$ and $d_k$ are complex constants, and λ−x indicates the one sampling added.

3. The phase-demodulation method according to claim 2, wherein the phase-error minimization is determined by a value of λ satisfying the following equation:

$$\gamma^2 = \left| \sum_{k=0}^{K} d_k^2 \right|$$

$$= c_0^2 \lambda^2 + c_{K-1}^2 + \sum_{k=1}^{K-1} (c_k^2 \lambda^2 + c_{k-1}^2 - 2c_{k-1} c_k \lambda)$$

$$= \sum_{k=0}^{K-1} c_k^2 \lambda^2 - 2 \sum_{k=1}^{K-1} c_{k-1} c_k \lambda + \sum_{k=0}^{K-1} c_k^2$$

where k is the number of sampling times, $C_k$ and $d_k$ are complex constants, and γ is a phase error.

* * * * *